Patented Aug. 25, 1931

1,820,540

UNITED STATES PATENT OFFICE

THOMAS A. MARTONE, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS OF MAKING LAKES

No Drawing.    Application filed May 28, 1928.   Serial No. 281,373.

This invention relates to dye lakes, and more particularly to lakes produced by conversion of the dye formed by coupling diazotized 2-amino-naphthalene-1-sulfonic acid with beta-naphthol into the barium and calcium salts.

In the process of making these barium and calcium salts the 2-amino-naphthalene-1-sulfonic acid (Tobias acid) diazotizes slowly and gives rise to a relative insoluble diazonium compound. In order to bring about the coupling, it is necessary to heat the compound almost to the boiling point on account of the poor solubility of the diazotized Tobias acid. In consequence, large crystals are produced, and these large crystals resist conversion into barium and calcium salts because of their small surface and insolubility. As a result, it has been found difficult to produce lakes in good yields, that is, lakes that exhibit good strength when ground in oil, as might be expected from the cause of the difficulty, and also it has been hard to control the exact color of the product which varies from a yellow to a blue shade according to the size of the particles of pigment.

An object of my invention, therefore, is the production of an improved diazonium compound. A further object of my invention is the production of compounds of this kind that exhibits good strength when converted into lakes. Other objects will appear as the description proceeds.

Now, according to my invention the difficulties heretofore experienced are eliminated by proceeding in the manner indicated hereinafter.

Instead of diazotizing the Tobias acid alone I carry out the diazotization in the presence of finely divided beta-naphthol. Under these conditions if, after the diazotization is complete, the acidity is reduced to that of bi-carbonate, or the mixture made slightly alkaline, coupling takes place very uniformly and much more rapidly. The yield is better and the character of the precipitate can be controlled with certainty. It may be stated that the effect of the presence of the beta-naphthol is to prevent the formation of large plate-like crystals of the diazotized Tobias acid. The crystals remain very fine and are in the form of needles instead of plates. These needle-like crystals are the ones that are needed for a rapid, uniform coupling. Why the presence of the naphthol should control the size of the crystals is not definitely known.

The following examples are presented as specific embodiment of working formulæ of my invention, but it will be understood, of course, that these are illustrative only, and are not to be taken as a limitation thereof.

*Medium barium lake*

Tub I:—

|  | Per cent |
|---|---|
| 30.0 grams beta-naphthol | 100 |
| 10.0 grams caustic soda | 100 |

Dissolve the beta-naphthol in the caustic soda by heating to 140° F. Add 400 cc. water, making total volume of 500 cc. Cool this solution to 32° F. with ice. Add enough ice to keep this temperature constant throughout the coupling. To the beta-naphthol solution add:

|  | Per cent |
|---|---|
| 40.0 grams acetic acid | 99.5 |
| 71.1 grams hydrochloric acid | 37.5 |

Add the acetic acid, then after stirring a few minutes add the hydrochloric acid. Agitate 5 minutes.

Tub II:—

45.0 grams 2-amino-naphthalene-1-sulfonic acid is dissolved in 8.8 grams caustic soda (10% solution in water) and 250 cc. hot water.

Make up volume to about 800 cc. After cooling with ice to 32° F. add:

13.8 grams sodium nitrite (10% solution in water) to the cooled 2-amino-naphthalene-1-sulfonic acid solution.

Combining I and II:—

Add the 2-amino-naphthalene-1-sulfonic acid solution at 32° F. slowly to the beta-naphthol suspension at 32° F. Test for sodium nitrite (should be a slight excess by test to starch iodide). Diazotize from 3 to 5 minutes holding temperature at 32° F. Then add with a medium rapidity:

30.0 grams caustic soda (10% solution in water) at 68° F. (100%). Follow immediately by 60.0 grams barium chloride (10% solution in water) at 68° F. as rapidly as possible. Agitate 10 minutes. Heat to 170° F. slowly. Dilute with water. Stir 4 hours. Wash twice, filter and dry at 130° F.

*Light barium lake*

Tub I:—

| | Per cent |
|---|---|
| 30.0 grams beta-naphthol | 100 |
| 10.0 grams caustic soda (10% solution in water) | 100 |

Dissolve the beta-naphthol in the caustic by heating to 140° F. Add:

400 cc. water making total volume of 500 cc. Cool this solution to 32° F. with ice. Add:

60.0 grams barium chloride (10% solution in water) to the beta-naphthol under good agitation. Adjust temperature to 32° F. with ice. Stir for 10 minutes.

Tub II:—

Dissolve 45.0 grams 2-amino-naphthalene-1-sulfonic acid (100%) in 8.8 grams caustic soda (10% solution in water) and 250 cc. water (hot). Make up to a volume of about 800 cc. After cooling with ice to 32° F. add:

13.8 grams sodium nitrite 100% (10% solution in water) to the cooled 2-amino-naphthalene-1-sulfonic acid solution. Add the 2-amino-naphthalene-1-sulfonic acid solution at 32° F. slowly to the beta-naphthol suspension and stir 5 minutes, at a temperature of 32° F., and then add:

| | Per cent |
|---|---|
| 40.0 grams acetic acid | 99.5 |
| 71.0 grams hydrochloric acid | 37.5 |

Stir for a few minutes.

(There should be no test for nitrite. The diazo takes on a reddish brown cast which is probably due to a partial coupling.)

Add to the above suspension 41.0 grams caustic soda (100%) as rapidly as possible. (Test for alkali, which should be slightly in excess at all times.) Heat to 170° F.–180° F. slowly (1 hour). Agitate 1 hour, dilute with water, stir 4 hours, filter and dry. Yield—105–115 grams.

*Extra deep barium lake*

Tub I:—

| | Per cent |
|---|---|
| 30.0 grams beta-naphthol | 100 |
| 10.0 grams caustic soda | 100 |

Dissolve the beta-naphthol in the caustic soda and 100 cc. water by heating to 140° F. Dilute the beta-naphthol solution to a final volume of 500 cc. with cold water. Cool to 50° F. Add:

40.0 grams acetic acid (99.5%)
80.0 grams hydrochloric acid (37.36%)
Agitate slowly 3 minutes.

Tub II:—

45.0 grams 2-amino-naphthalene-1-sulfonic acid (99.8%)
8.8 grams caustic soda (100%)

Dissolve the 2-amino-naphthalene-1-sulfonic acid in the caustic and 88 cc. water. Make up to a final volume of 300 cc. Cool to 50° F.

Combining I and II:

Add the 2-amino-naphthalene-1-sulfonic acid solution rapidly to the acid beta-naphthol suspension. Then add:

15.5 grams sodium nitrite (100%) in 155 cc. water (cold)—50° F. Diazotize 2 minutes. Then add rapidly 43.0 grams caustic soda (100%) in 433 cc. water at 50° F. Immediately follow with:

60.0 grams barium chloride (100%) in 600 cc. water at 50° F. Heat slowly to 170° F. in ½ hour. During the heating, test at frequent intervals for alkali. There should be a slight test to brilliant yellow at all times during the coupling. If no test is obtained add more caustic until the desired test is acquired. Dilute with water. Wash three times, filter and dry at 140° F.

*Calcium lake*

Tub I:—

30.0 grams beta-naphthol 100%.
10.0 grams caustic soda (10% solution in water) (100%) 70° F. Dissolve the beta-naphthol in the caustic soda by heating to 140° F. Hold at this temperature until all the beta-naphthol is dissolved. Make up to 500 cc. with water at 100° F. Cool the solution to 32° F. with ice, then add:

40.0 grams acetic acid 99.5%. Follow immediately with 71.0 grams hydrochloric acid 37.36%. Stir 5 minutes.

Tub II:—

45.0 grams 2-amino-naphthalene-1-sulfonic acid 100%

8.8 grams caustic soda (10% solution in water) (100%) 70° F. Paste the 2-amino-naphthalene-1-sulfonic acid in the caustic soda. Then add 300 cc. water at 212° F. Immediately cool with ice to 32° F. Final volume of ice and 2-amino-naphthalene-1-sulfonic acid solution should not exceed 800 cc.

Combining I and II:—

Add the 2-amino-naphthalene-1-sulfonic acid solution during a 5 minute period to the acid beta-naphthol suspension at 32° F. Run in slowly during the course of 5 minutes, then add:

13.8 grams sodium nitrite (10% solution in water) 70° F. Test for nitrite (should be distinctly positive test to potassium starch iodide). Diazotize 5 minutes while holding at a temperature of 32° F. After diazotization is complete add:

35.0 grams caustic soda (10% solution in water) at 70° F. in 1 minute. Follow the addition of caustic soda immediately with:

35.0 grams calcium chloride (10% solution in water) at 70° F. during 1 minute. Heat slowly in 1 hour to 170° F. There should be a negative test at all times to brilliant yellow paper and a positive test to blue litmus. After heating is complete subject the coupling to ½ hour's rapid agitation. Then dilute with water. Wash three times, filter and dry at 130° F.–140° F.

As many apparently widely different embodiments of this invention may be made without departing from the spirit thereof, it is to be understood that I do not intend to limit myself to the specific embodiments thereof except as indicated in the appended claims.

I claim:

1. In the process of producing intermediates for lakes, the step which comprises diazotizing 2-amino-naphthalene-1-sulfonic acid in the presence of beta-naphthol.

2. The process of producing alkaline earth metal lakes, which comprises diazotizing 2-amino-naphthalene-1-sulfonic acid in the presence of beta-naphthol and adding to the diazotized acid a solution containing a soluble alkaline earth metal salt.

3. The process of producing barium lakes, which comprises diazotizing 2-amino-naphthalene-1-sulfonic acid in the presence of beta-naphthol and adding to the diazotized acid a solution containing a soluble barium salt.

4. The process of producing barium lakes, which comprises diazotizing 2-amino-naphthalene-1-sulfonic acid in the presence of beta-naphthol and adding to the diazotized acid a solution containing barium chloride.

In testimony whereof, I affix my signature.

THOMAS A. MARTONE.